United States Patent [19]
Bredt et al.

[11] 3,899,360
[45] Aug. 12, 1975

[54] STABILIZED P-TYPE LEAD TELLURIDE

[75] Inventors: James H. Bredt, Garrett Park, Md.; Louis F. Kendall, Jr., Scotia, N.Y.

[73] Assignee: General Electric Company, Schenectady, N.Y.

[22] Filed: Mar. 1, 1971

[21] Appl. No.: 119,821

Related U.S. Application Data

[63] Continuation of Ser. No. 756,395, Aug. 30, 1968, abandoned.

[52] U.S. Cl............... 136/238; 75/134 M; 136/239; 252/62.3 T
[51] Int. Cl............................................. H01v 1/18
[58] Field of Search................... 136/236, 238, 239; 75/134 M, 166 A; 252/62.3 T, 62.3 S

[56] References Cited
UNITED STATES PATENTS

| | | | |
|---|---|---|---|
| 2,811,569 | 10/1957 | Fredrick et al. | 136/238 |
| 3,285,019 | 11/1966 | Henderson et al. | 136/238 |
| 3,403,133 | 9/1968 | Fredrick et al. | 136/238 |
| 3,480,554 | 11/1969 | Kendall, Jr. et al. | 136/239 |

FOREIGN PATENTS OR APPLICATIONS

| | | | |
|---|---|---|---|
| 1,348,642 | 12/1963 | France | 136/238 |

*Primary Examiner*—Harvey E. Behrend
*Attorney, Agent, or Firm*—Charles T. Watts; Joseph T. Cohen; Jerome C. Squillaro

[57] ABSTRACT

It is disclosed that when power generating thermopiles comprised of lead telluride thermoelements are operated at temperatures above about 400°C, the metal electrodes in contact with the ends of the thermoelements tend to diffuse into the lead telluride. The metals used for the electrodes are n-type dopants and degrade the properties of the p-type thermoelements. Manganese telluride has a low solid solubility limit in lead telluride. By saturating the p-type lead telluride with manganese telluride, the diffusion of the electrode material into the lead telluride is substantially eliminated without materially reducing the electrical properties.

2 Claims, No Drawings

STABILIZED P-TYPE LEAD TELLURIDE

The invention decribed herein was made in the course of or under a contract with the Air Force.

This is a continuation of application Ser. No. 756,395 filed on Aug. 30, 1968, now abandoned.

CROSS REFERENCE

Cross reference is made and incorporation by reference to application Ser. No. 598,937, filed Dec. 6, 1966, entitled "Single Phase Lead Telluride," Kendall and Bredt and assigned to the assignee of the present invention, and issued as U.S. Pat. No. 3,480,554 on Nov. 25, 1969.

This invention relates to the thermoelectric generation of power and, more particularly, to p-type lead telluride thermoelements having improved stability for use therein.

The thermal generation of electric power by means of a plurality of semiconductive thermocouples is known. In the construction of power-generating thermopiles composed of p and n-type semiconductive lead telluride thermoelements, it is necessary to complete the electrical circuit by providing metallic electrodes in intimate electrical contact with the lead telluride elements at both their hot and cold ends. A rather wide variety of electrode materials and joining methods have been found satisfactory for the connections on the ends of the thermoelements which operate at comparatively low temperatures, i.e. below about 300°C, but no completely satisfactory electrode system has yet been found for contracts to p-type lead telluride thermoelements which must run at operating temperatures above about 400°C. All known metals or alloys which can be used for electrodes at these temperatures react to a greater or lesser degree with lead telluride. Some, for example copper or nickel, react very extensively with lead telluride to cause catastrophic failure of the thermoelements. Others, such as iron and iron base alloys for example, react only slightly and permit joints of satisfactory initial quality to be made, but diffuse relatively slowly into the lead telluride during high temperature operation and gradually degrade the properties of the p-type material because these metals are n-type dopants. It would be desirable to prevent or substantially eliminate this diffusion and such is a principal object of this invention. Other and different objects of the invention will become apparent to those skilled in the art from the following disclosure.

It has been found that the transition metals generally have only a slight solid solubility in lead telluride, amounting to about one or two atomic per cent at temperatures in the range of operation of these thermocouples. It has also been found that in general the solubilities of these metals increase somewhat as the temperature increases. It is believed that these metals have atomic sizes which do not fit very well in the lead telluride crystal lattice at lower temperatures but become more soluble as thermal expansion opens up the lattice. Therefore a lead telluride crystal which is substantially saturated with one transition metal is relatively impermeable to diffusion by a second similar metal, providing the first metal does not "poison" or significantly affect the semiconductive properties of the p-type lead telluride.

It has been found that manganese, when incorporated in p-type lead telluride as MnTe, has relatively slight effects on the thermoelectric properties. Such lead telluride bodies which were essentially single crystals were prepared in the manner set forth in our copending application Ser. No. 598,937, now U.S. Pat. No. 3,480,554 as previously referenced, and the following representative properties were measured at room temperature:

| Sample | Resistivity (milliohm cm.) | Seebeck Coefficient (microvolts/°C.) |
| --- | --- | --- |
| p-type PbTe | 3.31 | + 224 |
| With 1 mol % MnTe | 5.09 | + 187 |
| With 3 mol % MnTe | 2.7–14.4 | + 162 |

As will be seen, manganese has a mild n-type doping effect on the p-type lead telluride, but the effect upon its performance as a thermogenerator element is negligible. It will be noted that the 3 mol per cent MnTe material exceeded the room temperature solid solubility of MnTe in PbTe which accounts for the wide range of resistivities measured. At higher temperatures, the excess MnTe goes into solution with a valve of about 4 mol per cent being the saturation value for temperatures in the neighborhood of 600°C. An additional advantage of the 1 mol per cent MnTe material was a drop in room temperature thermal conductivity from 21.6 milliwatts/cm°C for the reference p-type lead telluride to 19.1 for the MnTe containing material.

From the foregoing, it will be apparent that if it is desired to operate the thermoelement at a temperature of 650°C, more manganese telluride will be required to saturate the lead telluride than if it is to be operated at a lower temperature, for example, 400°C. Furthermore, any manganese telluride in an amount in excess of that needed to form a saturated solid solution at the selected operating temperature will be present as a second phase and will have an undesirable effect on the electrical conductivity of the thermoelement.

It will be apparent to those skilled in the art that certain modifications may be made, all within the scope of this invention. It is therefore not intended to restrict the scope of the invention in any way except as set forth in the appended claims.

What we claim as new and desire to secure by letters patent of the United States is:

1. A thermoelectric generator component for operation at a selected temperature above 400°C comprising a semiconducting thermoelement and a metal electrode in intimate electrical contact with the thermoelement, said electrode being of a metal selected from the group consisting of iron and iron-base alloys, and said thermoelement consisting essentially of a solid solution of a relatively small amount of manganese telluride in p-type lead telluride which solid solution is saturated at the selected operating temperature above 400°C.

2. The thermoelectric generator component of claim 1 in which the selected operating temperature is about 600°C and the manganese telluride content of the semiconducting lead telluride thermoelement is about 4 mol per cent and the solid solution of manganese telluride in p-type lead telluride is saturated at the said selected operating temperature.

* * * * *